(12) United States Patent
Revow

(10) Patent No.: US 7,734,094 B2
(45) Date of Patent: Jun. 8, 2010

(54) TECHNIQUES FOR FILTERING HANDWRITING RECOGNITION RESULTS

(75) Inventor: Michael Revow, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 925 days.

(21) Appl. No.: 11/478,500

(22) Filed: Jun. 28, 2006

(65) Prior Publication Data

US 2008/0002887 A1 Jan. 3, 2008

(51) Int. Cl.
G06K 9/00 (2006.01)
G06K 9/18 (2006.01)
G06F 17/21 (2006.01)

(52) U.S. Cl. ..................... 382/189; 715/268; 382/186

(58) Field of Classification Search .............. 382/100, 382/115, 116, 119, 159, 178, 179, 181, 185, 382/186, 187, 188, 189, 220, 229
See application file for complete search history.

(56) References Cited

U.S. PATENT DOCUMENTS

| | | | |
|---|---|---|---|
| 4,731,857 A | | 3/1988 | Tappert |
| 5,005,205 A | | 4/1991 | Ellozy et al. |
| 5,544,260 A | | 8/1996 | Chefalas et al. |
| 5,666,438 A | | 9/1997 | Beernink et al. |
| 5,742,705 A | | 4/1998 | Parthasarathy |
| 5,764,797 A | * | 6/1998 | Adcock ...................... 382/187 |
| 5,805,710 A | * | 9/1998 | Higgins et al. .............. 382/101 |
| 5,812,697 A | | 9/1998 | Sakai et al. |
| 5,917,942 A | | 6/1999 | Ehsani et al. |
| 5,920,477 A | * | 7/1999 | Hoffberg et al. ............ 382/181 |
| 6,256,410 B1 | | 7/2001 | Nathan et al. |
| 6,567,548 B2 | | 5/2003 | Nathan et al. |
| 7,003,158 B1 | * | 2/2006 | Bennett et al. .............. 382/187 |
| 7,200,267 B1 | * | 4/2007 | Bennett et al. .............. 382/187 |
| 2004/0095374 A1 | * | 5/2004 | Jojic et al. .................. 345/716 |
| 2004/0213455 A1 | | 10/2004 | Lossev et al. |

(Continued)

FOREIGN PATENT DOCUMENTS

JP 2005-141329 A 6/2005

OTHER PUBLICATIONS

Aksela et al., "Methods for adaptive combination of classifiers with application to recognition of handwritten characters", International Journal on Document Analysis and Recognition (2003) 6:23-41.*

(Continued)

*Primary Examiner*—Andrew W Johns
*Assistant Examiner*—Tahmina Ansari

(57) ABSTRACT

Various technologies and techniques are disclosed that identify possible incorrect recognition results. Handwritten input is received from a user. A recognition operation is performed on the handwritten input to produce an initial recognition result. A possible incorrect recognition is identified using the self-consistency process that identifies the possible incorrect recognition when the initial recognition result is not consistent with a normal writing style of the user. The self-consistency process performs a comparison of the initial recognition result with at least one sample previously provided by the user. If the comparison reveals that the initial recognition result is not consistent with the at least one sample, then the result is identified as possibly incorrect. A classifier confidence process can be alternatively or additionally used to identify a possible incorrect recognition result. The user interface for displaying the final result can be modified as appropriate given the possible incorrect recognition result.

20 Claims, 8 Drawing Sheets

U.S. PATENT DOCUMENTS

2004/0234128 A1  11/2004  Thiesson et al.
2005/0249419 A1  11/2005  Rieman

OTHER PUBLICATIONS

Mankoff, Jennifer et al., "Providing Integrated Toolkit-Level Support for Ambiguity in Recognition-based Interfaces", CHI 2000 CHI Letters, vol. 2, Issue 1, Apr. 1-6, 2000, pp. 368-375.*

International Search Report, PCT/US2007/013534, Oct. 30, 2007, pp. 1-9.

Drissman, Avi, et al.,"Handwriting Recognition Systems: An Overview","Feb. 26, 1997", http://www.drissman.com/avi/school/HandwritingRecognition.pdf.

Sanchez, Gomez E., "On-Line Character Analysis and Recognition with Fuzzy Neural Networks" http://ulises.tel.uva.es/uploaded_files/paper5.pdf.

Oh, Jong, "An On-Line Handwriting Recognizer with Fisher Matching, Hypotheses Propagation Network and Context Constraint Models","May 2001", http://www.cs.nyu.edu/web/Research.

* cited by examiner

TECHNIQUES FOR FILTERING HANDWRITING RECOGNITION RESULTS

BACKGROUND

Handwriting recognition systems on devices such as Tablet PCs or Pocket PCs typically employ machine learning models to produce good walkup accuracy for a large variety of writing styles but errors still occur for some individual writing styles. Personalizing a handwriting recognizer using explicit samples where the user confirms the true translation of the sample is time consuming and thus many users either forego this step or provide insufficient samples. A better approach is to use implicit samples collected while the user goes about their normal tasks. To effectively make use of implicit data, good filtering techniques are needed to distinguish the cases where the recognized result is more likely to be correct from the instances when they are incorrect

SUMMARY

Various technologies and techniques are disclosed that identify and quantify the degree of possible "incorrectness" in recognition results returned by a handwriting recognizer. Handwritten input is received from a user. A recognition operation is performed on the handwritten input to produce an initial recognition result. A possible incorrect recognition is identified using a self-consistency process that identifies the possible incorrect recognition when the initial recognition result is not consistent with a normal writing style of the user. Using the recognition result returned by the recognition process, the self-consistency process performs a comparison of the handwriting style corresponding to the result with other sample(s) previously provided by the user. If the comparison reveals that the initial recognition result is not consistent with these sample(s), then the result is identified as possibly incorrect. The system can choose to down weigh or ignore the possibly incorrect recognition. In one implementation, a classifier confidence process can be used in addition to or instead of the self confidence process to determine whether the initial recognition result has a sufficiently high confidence score, and if not, then the result is marked as possibly incorrect.

In another implementation, the workflow of a user who uses a handwriting recognition system can be altered depending on whether the handwriting translation is likely to be correct or not. As a few non-limiting examples, when the translation is likely to be correct, only the single correct result can be displayed to the user on a user interface, whereas when the translation is less likely to be correct a list of alternates can be automatically displayed to the user.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
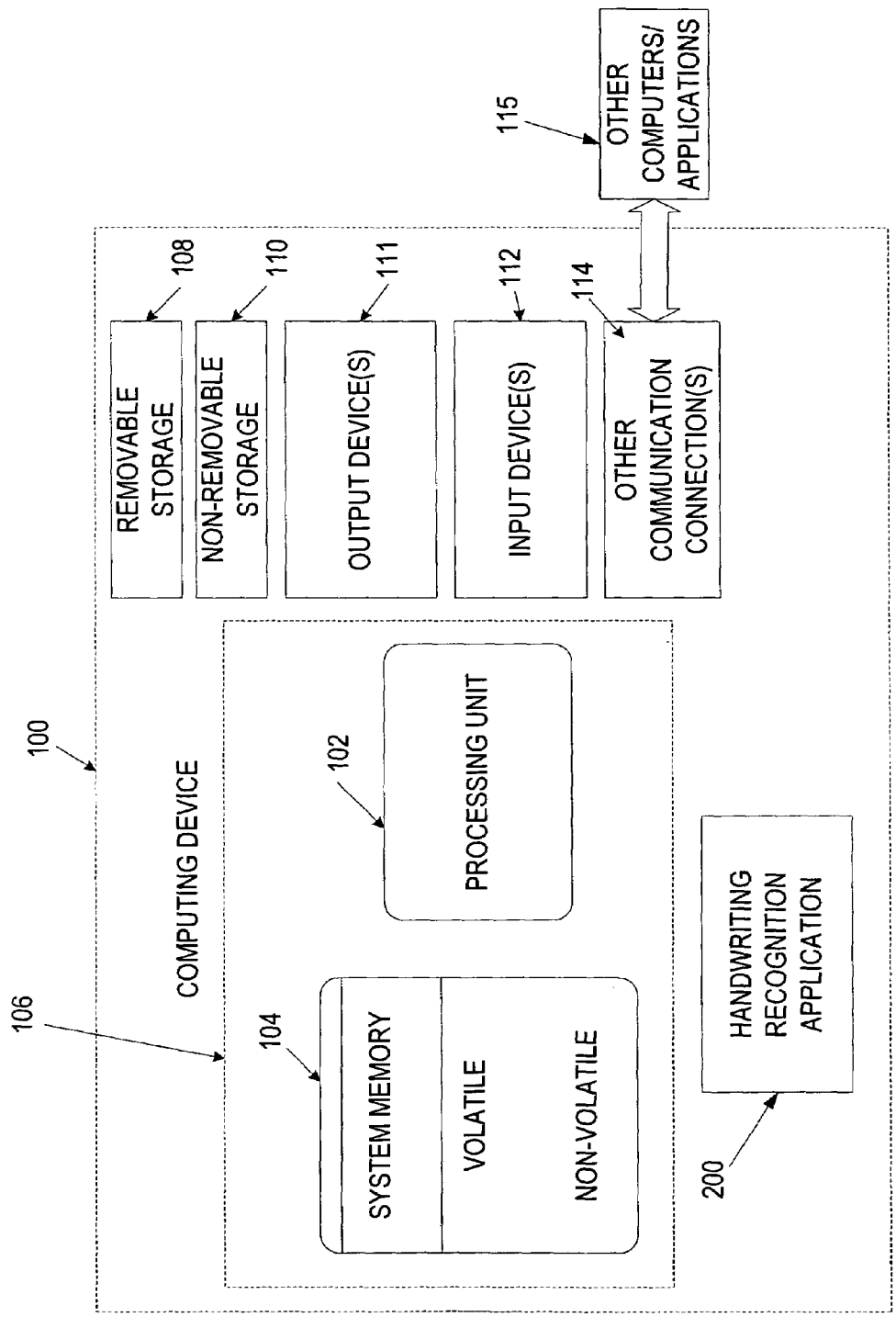
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that performs handwriting recognition, but the system also serves other purposes in addition to these. In one implementation, one or more of the techniques described herein can be implemented as features within a handwriting recognition program, or from any other type of program or service that allows a user to input handwritten input. In one implementation, the system learns from a user's own handwriting during normal use without requiring the user to identify what recognitions were correct versus incorrect.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/ functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes handwriting recognition application 200. Handwriting recognition application 200 will be described in further detail in FIG. 2.

Figure 2:
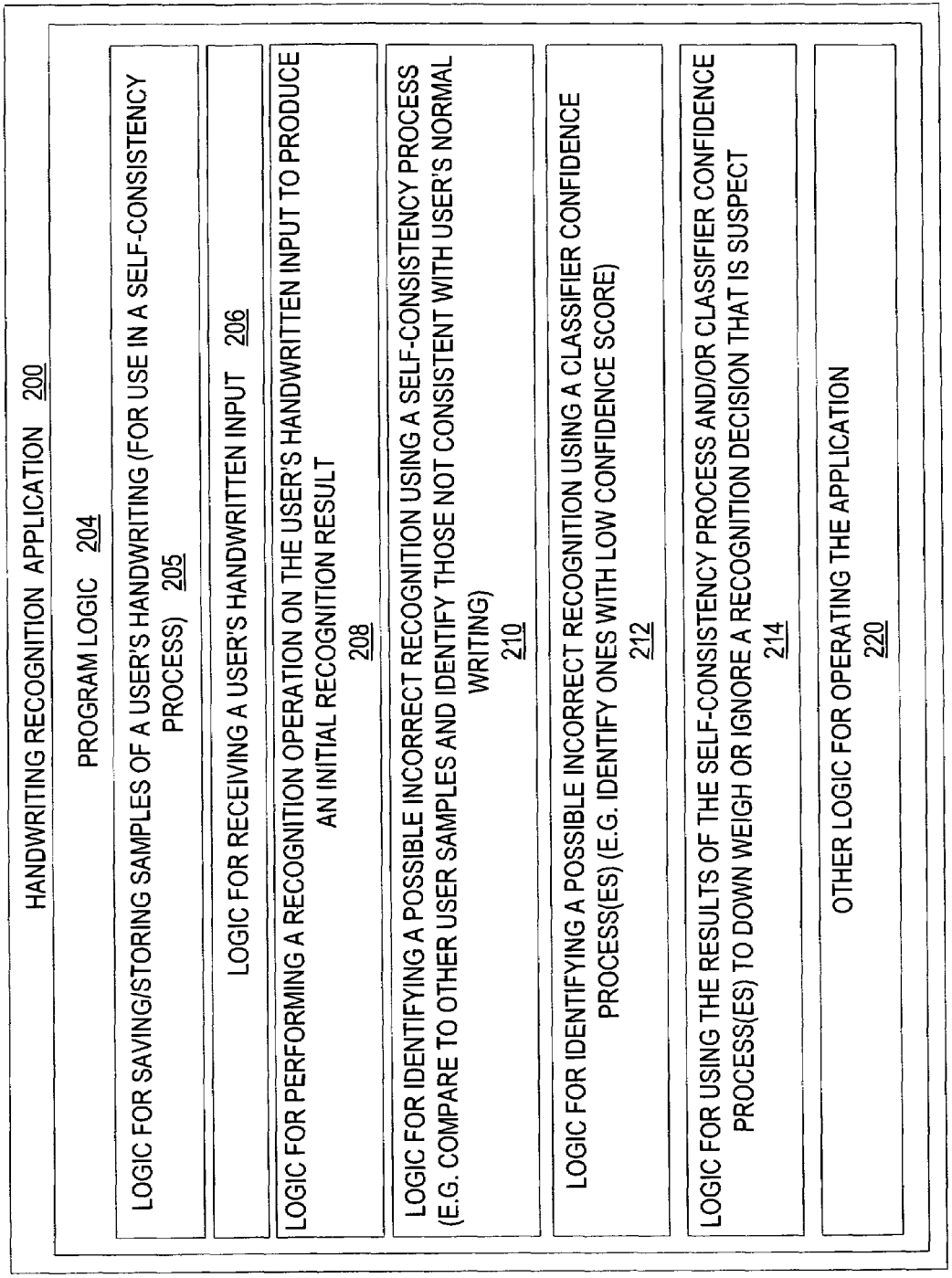
FIG. 2 is a diagrammatic view of a handwriting recognition application of one implementation operating on the computer system of FIG. 1.

Turning now to FIG. 2 with continued reference to FIG. 1, a handwriting recognition application 200 operating on computing device 100 is illustrated. Handwriting recognition application 200 is one of the application programs that reside on computing device 100. However, it will be understood that handwriting recognition application 200 can alternatively or additionally be embodied as computer-executable instructions on one or more computers and/or in different variations than shown on FIG. 1. Alternatively or additionally, one or more parts of handwriting recognition application 200 can be part of system memory 104, on other computers and/or applications 115, or other such variations as would occur to one in the computer software art.

Handwriting recognition application 200 includes program logic 204, which is responsible for carrying out some or all of the techniques described herein. Program logic 204 includes logic for saving/storing samples of a user's handwritten input (e.g. for use in a self-consistency process) 205; logic for receiving a user's handwritten input 206; logic for performing a recognition operation on the user's handwritten input to produce an initial recognition result 208; logic for identifying a possible incorrect recognition using a self consistency process (e.g. compare to other user samples and identify those not consistent with user's normal writing) 210; logic for identifying a possible incorrect recognition using classifier confidence process(es) (e.g. identify ones with low confidence score) 212; logic for using the results of the self consistency process and/or classifier confidence process(es) to down weigh or ignore a recognition decision that is suspect 214; and other logic for operating application 220. In one implementation, program logic 204 is operable to be called programmatically from another program, such as using a single call to a procedure in program logic 204.

Figure 3:
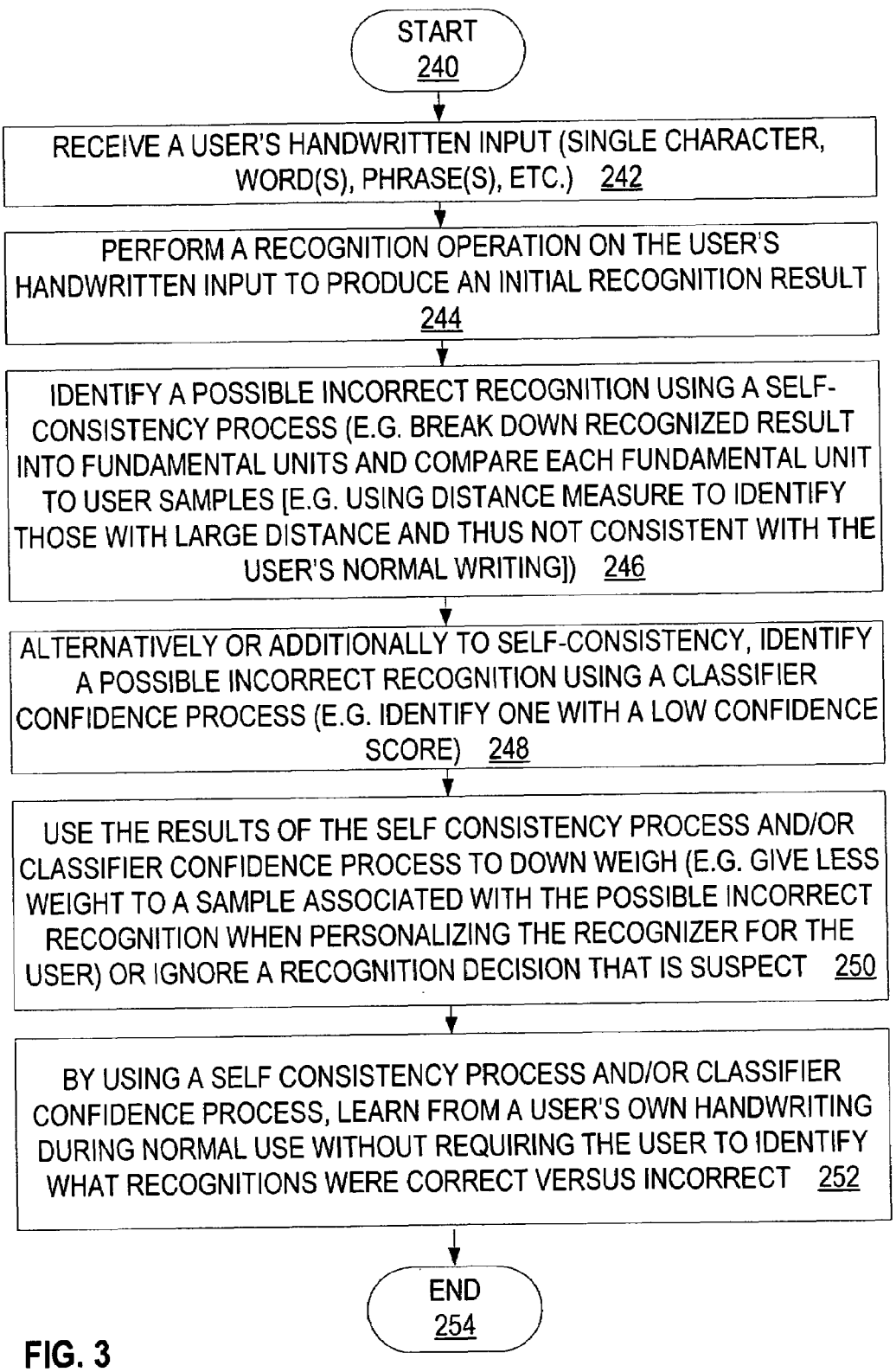
FIG. 3 is a high-level process flow diagram for one implementation of the system of FIG. 1.

Turning now to FIGS. 3-6 with continued reference to FIGS. 1-2, the stages for implementing one or more implementations of handwriting recognition application 200 are described in further detail. FIG. 3 is a high level process flow diagram for handwriting recognition application 200. In one form, the process of FIG. 3 is at least partially implemented in the operating logic of computing device 100.

The procedure begins at start point 240 with receiving a user's handwritten input (stage 242). The input can be a single character at a time or words or phrases. The term "character" as used herein is meant to include any fundamental unit of handwriting, which in some languages (such as Japanese), may mean part of a character (e.g. a radical). A recognition operation is performed on the user's handwritten input to produce an initial recognition result (stage 244). A possible incorrect recognition is identified using a self-consistency process (stage 246). In one implementation, the initial recognized result is first broken down into fundamental units, (for example characters) and then each fundamental unit is compared to other samples from the user for style consistency (e.g. using a distance measure). One such implementation using a distance measure is described in further detail in FIG. 5. Samples in which the distance is large are marked as inconsistent with the user's normal writing (stage 246).

Alternatively or additionally to the self-consistency process to identify possible incorrect recognitions, the system can use the classifier confidence of the initial recognition process to identify possible incorrect initial recognition results (e.g. identify a result with a low confidence score) (stage 248). In one implementation, confidence is computed using multiple classifiers and using the amount of agreement between the individual classifiers as confidence.

The results of the self-consistency process and/or classifier confidence process are used to down weigh (e.g. give less weight to a sample associated with the possible incorrect recognition when personalizing the recognizer for the user) or ignore a recognition decision that is suspect (stage 250). By using a self-consistency process and/or classifier confidence process, learn from a user's own handwriting during normal use without requiring the user to identify what recognitions were correct versus incorrect (stage 252). The process ends at end point 254.

Figure 4:
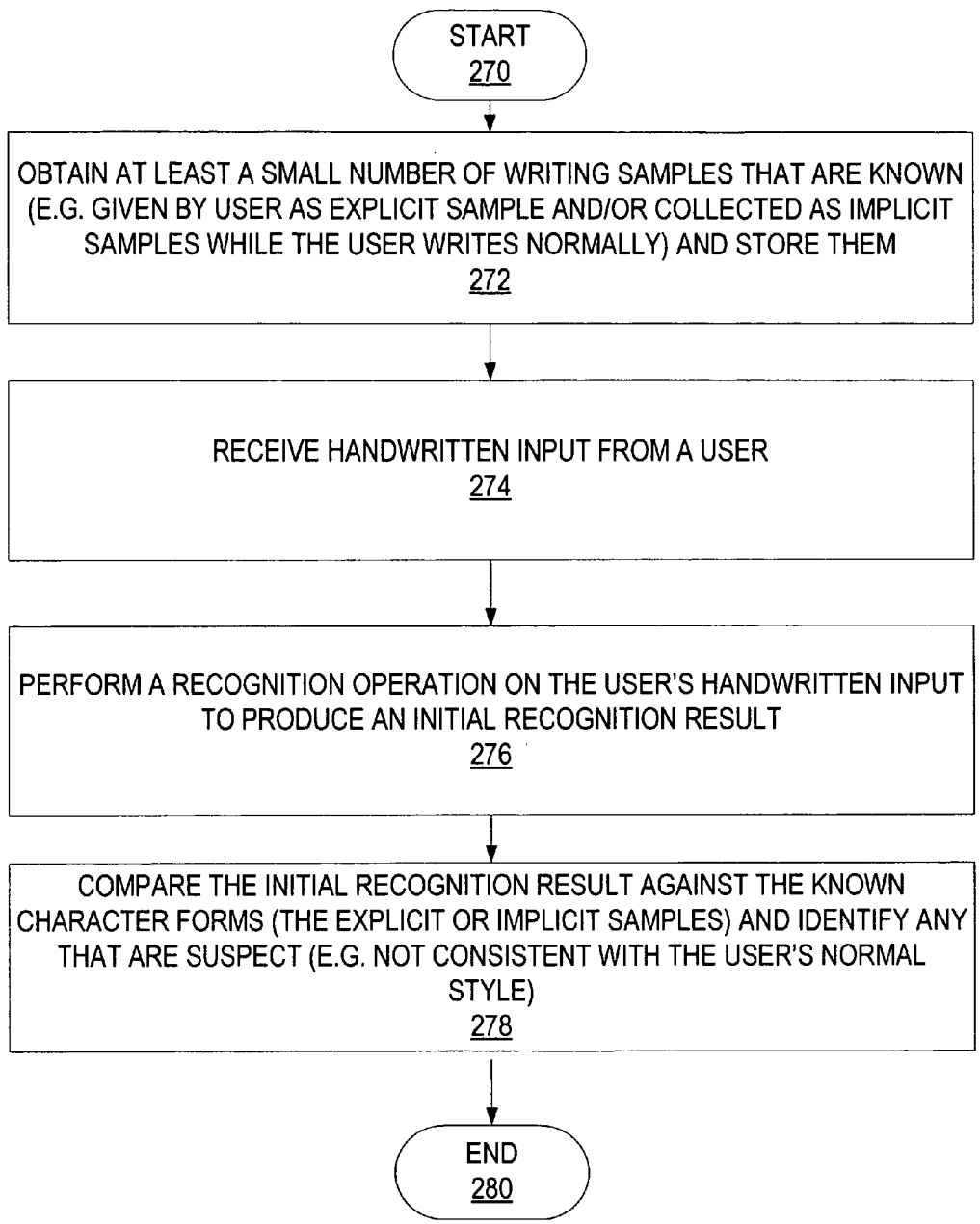
FIG. 4 is a process flow diagram for one implementation of the system of FIG. 1 illustrating the stages involved in performing a self-consistency process to identify a possible incorrect recognition.

FIG. 4 illustrates one implementation of the stages involved in performing a self-consistency process to identify a possible incorrect recognition. In one form, the process of FIG. 4 is at least partially implemented in the operating logic of computing device 100. The procedure begins at start point 270 with obtaining at least a small number (n) of writing samples that are known (e.g. given by user as explicit samples) and storing them as ink samples $\{I_1, I_2, \ldots I_n\}$ (stage 272). Alternatively or additionally, a moderate amount of implicit samples may be collected while the user writes during their normal use of the handwriting recognition system (stage 272). Handwritten input is received from a user (stage 274). A recognition operation is performed on the user's handwritten input to produce an initial recognition result (stage 276). The initial recognition result is compared against the known character forms (either explicit or implicit samples) and any results that are suspect (e.g. not consistent with the user's normal style) are identified (stage 278). The process ends at end point 280.

Figure 5:
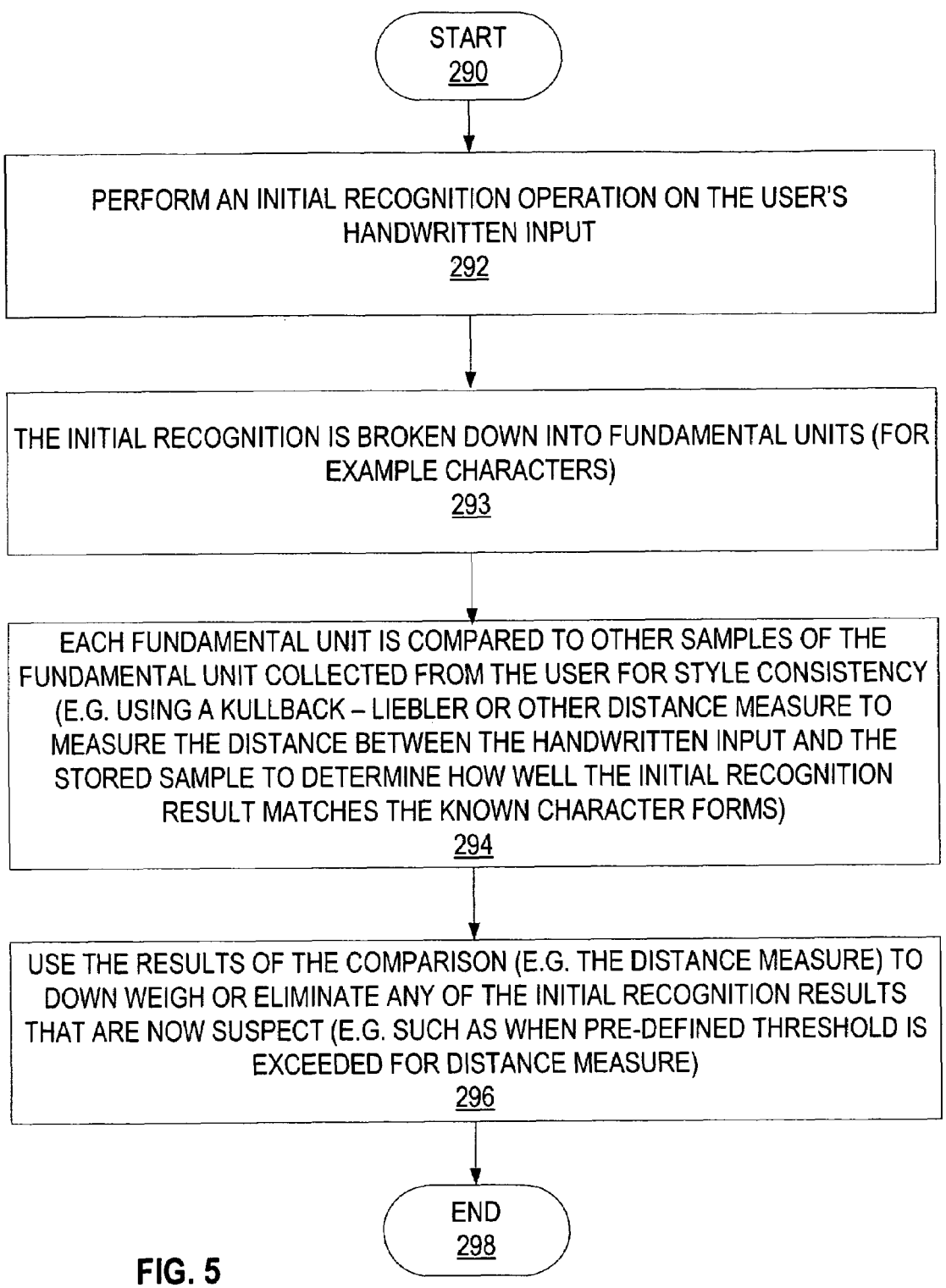
FIG. 5 is a process flow diagram for one implementation of the system of FIG. 1 illustrating the stages involved in using a Kullback-Liebler distance measure operation to determine degree of self-consistency.
Figure 6:
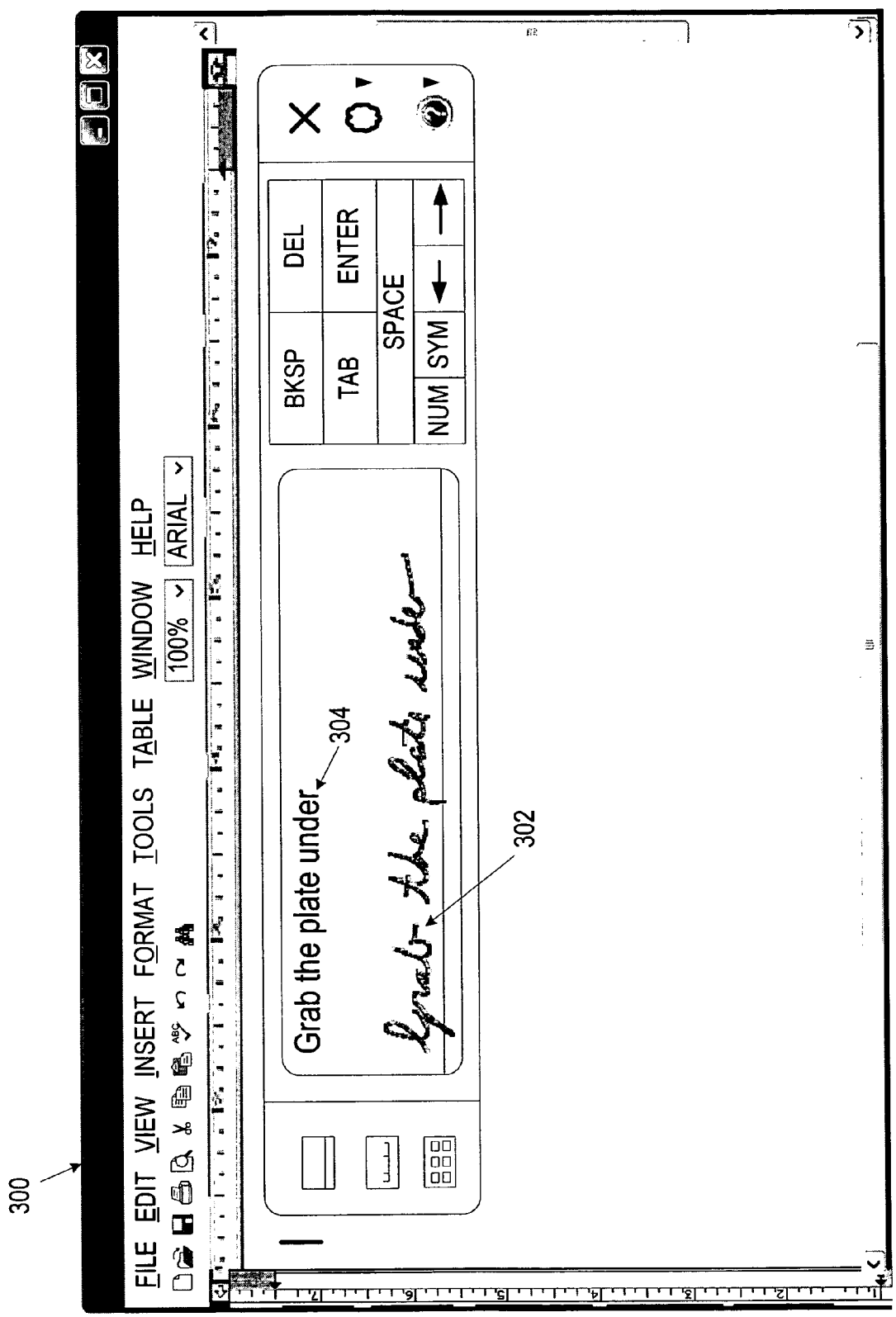
FIG. 6 is a simulated screen for one implementation of the system of FIG. 1 that illustrates the user providing an explicit writing sample.

FIG. 5 illustrates one implementation of the stages involved in using a Kullback-Liebler distance measure operation to determine self-consistency. In one form, the process of FIG. 5 is at least partially implemented in the operating logic of computing device 100. The procedure begins at start point 290 with performing an initial recognition operation on the user's handwritten input samples (stage 292). The initial recognition is broken down into fundamental units (for example characters) (stage 293), and each fundamental unit is compared to other samples of the fundamental unit collected from the user for style consistency (stage 294). In one such implementation, a metric to quantify the difference in style consistency is developed by first using the handwriting recognizer to produce a probability distribution, for sample S, $p_s(c|I_s)$, over all characters, c, supported by the classifier given implicit data $I_s$. Similarly, probability distributions $p_k(*)$ for each stored sample is also computed. The Kullback-Liebler, KL(s, k), distance between sample s and each stored exemplar k is computed:

$$KL(s, k) = \sum_c p_k(c \mid I_k)\log(p_k(c \mid I_k)/p_s(c \mid I_s))$$

In the above formula, $I_s$ is the current implicit sample and $I_k$ the kth stored sample. Stored samples can be collected explicitly, implicitly or both. For implicit samples, there is also uncertainty in the stored sample's identity and therefore KL(s,k) should be treated stochastically and correspondingly averaged with other instances, The results of the comparison (e.g. the distance measure) are then used to down weigh or eliminate individual characters in sample s used to personalize the classifier (stage 296). In one implementation, any sample containing one or more characters with a distance measure larger than a predefined threshold identifies the sample as suspect. The display of the recognized result in the pen input panel or other area for displaying recognized results is altered indicating that it is possibly incorrect. The process ends at end point 298.

Figure 7:
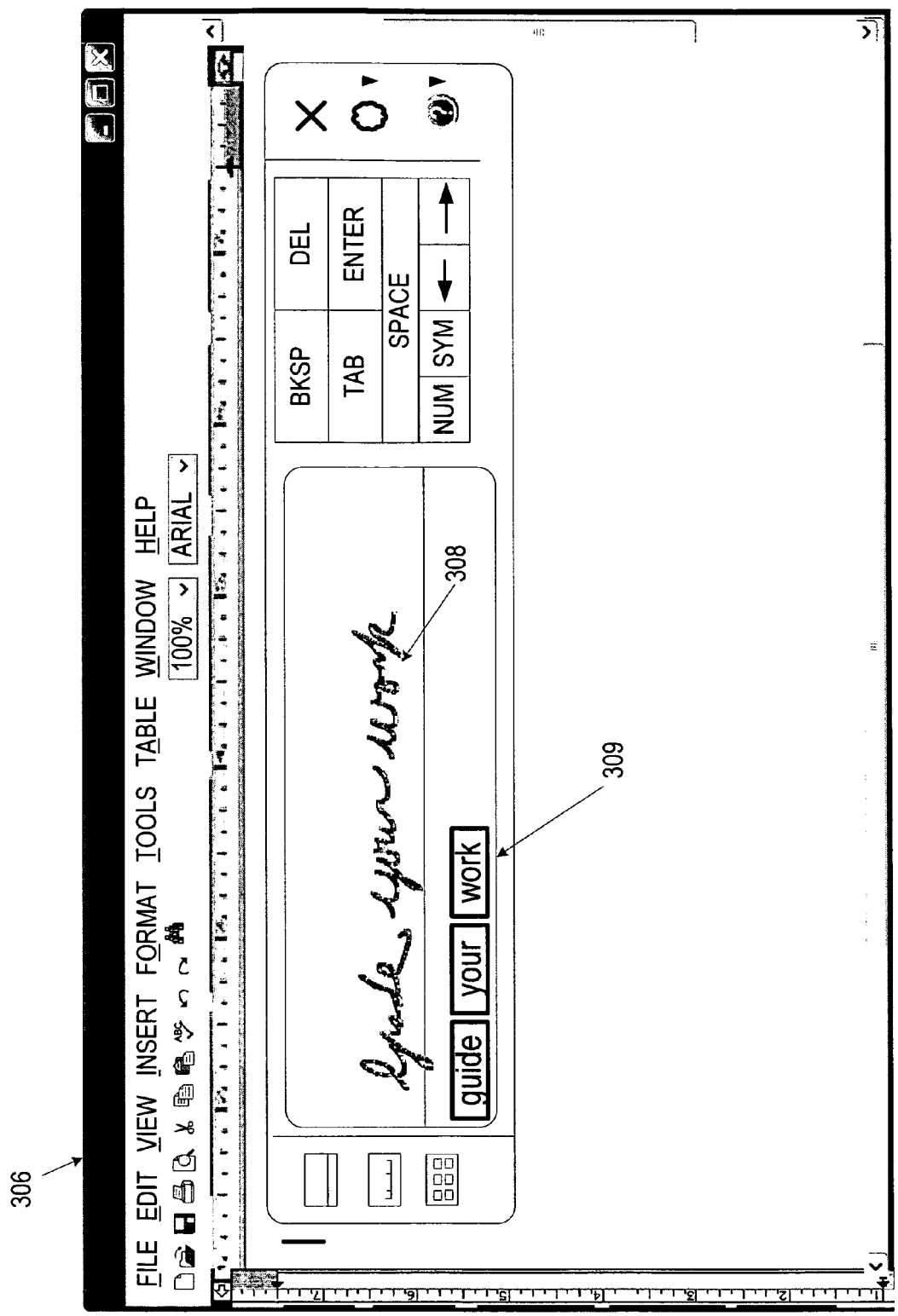
FIG. 7 is a simulated screen for one implementation of the system of FIG. 1 that illustrates an initial recognition operation that produced a recognition result that is suspect given the sample provided in FIG. 6.

Let's look at a non-limiting example using some simulated screens to further illustrate the self-consistency concept. Suppose, for example, that the user has already given at least one writing explicit sample. As shown in the simulated screen 300 of FIG. 6, the user has previously supplied an explicit writing sample 302 for the prompted phrase "Grab the plate under" 304. Later during the normal workflow, as shown in the simulated screen 306 of FIG. 7, the user inputs another phrase "Grade your work" 308 (again using a phrase containing a word with prefix "Gra"). The initial recognition result returned from the recognizer thinks the phrase is "Guide your work" 309 (e.g. that the "ra" is a "u"). Without applying one or more of the technologies and techniques discussed herein, the incorrect recognition result 309 would be used to update the classifier. Using the technologies and techniques discussed herein, however, upon receiving the user's handwritten input, the system performs the self-consistency process described in FIGS. 3-5. For example, the ink segment (erroneously) corresponding to the "u" in FIG. 7 is compared against the "u" collected in FIG. 6 as part of the word "under". Since the distance measure reveals that they are not closely enough related (i.e. not self consistent or matching), then the whole word "Guide" in FIG. 7 can be eliminated or downplayed in weight when the classifier is personalized for the user. Alternatively or additionally, just the ink segments corresponding to the poorly matching characters may be downplayed when updating the classifier.

Figure 8:
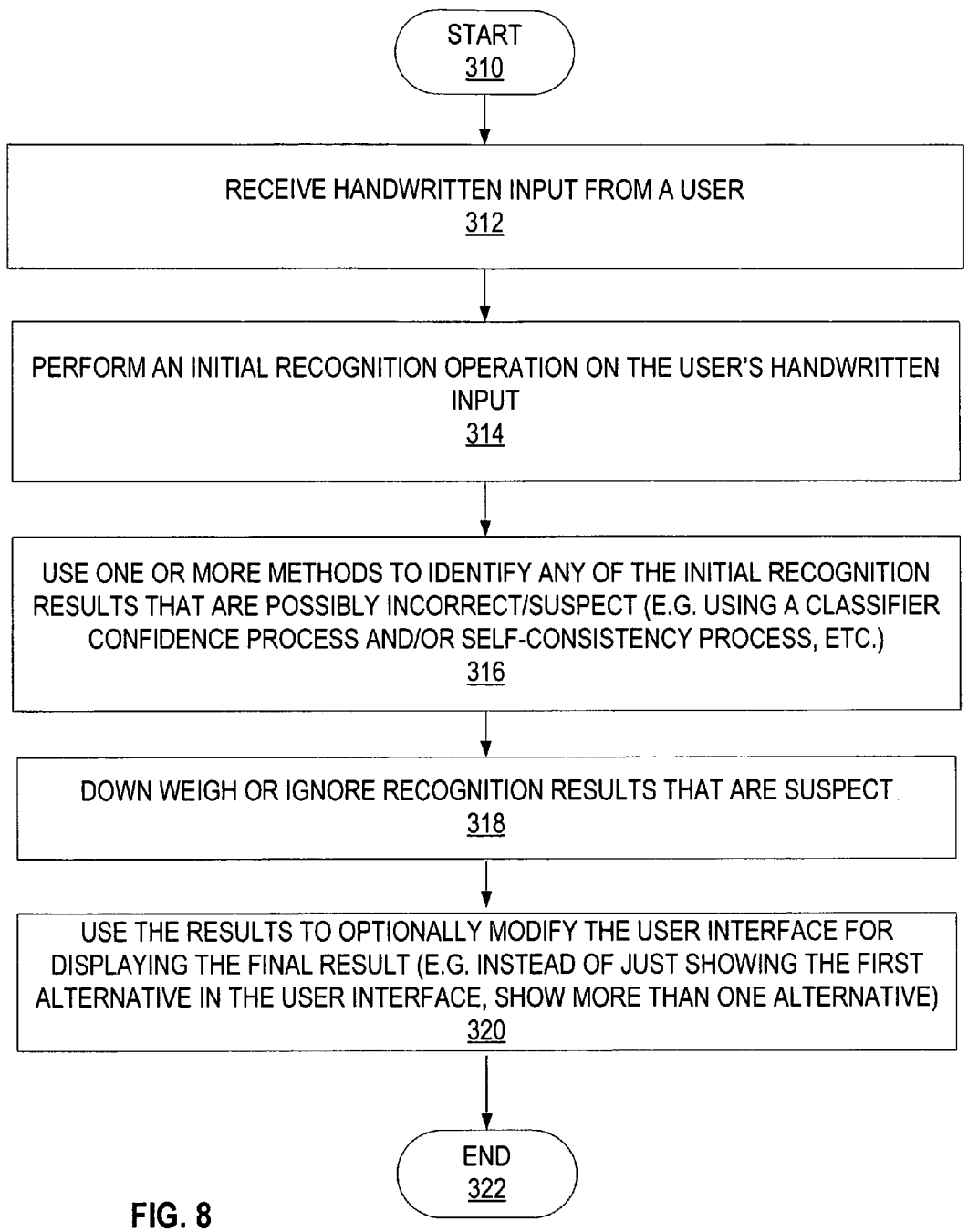
FIG. 8 is a process flow diagram for one implementation of the system of FIG. 1 illustrating the stages involved in identifying a possible incorrect recognition.

Turning now to FIG. 8, one implementation of the stages involved in identifying a possible incorrect recognition. In one form, the process of FIG. 8 is at least partially implemented in the operating logic of computing device 100. The procedure begins at start point 310 with receiving handwritten input from a user (stage 312). An initial recognition operation is performed on the user's handwritten input (stage 314). One or methods are used to identify any of the initial recognition results that are possibly incorrect/suspect (e.g. using a classifier confidence process and/or a self-consistency process, etc.) (stage 316). The system down weighs or ignores recognition results that are suspect (that have too low of a recognition confidence score) (stage 318). These results can optionally be used to modify the user interface for displaying the final result (stage 320). As one non-limiting example, instead of showing just the first alternative returned by the recognizer (as in FIG. 7), the user interface can automatically show the user more than one alternative for words which it detects as inconsistent (stage 320). The process ends at end point 322.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screens, and/or data layouts as described in the examples discussed herein could be organized differently on one or more computers to include fewer or additional options or features than as portrayed in the examples.

What is claimed is:

1. A computer-readable medium having computer-executable instructions for causing a computer to perform a method for identifying handwriting recognition decisions that are suspect comprising:
    storing one or more samples of handwriting of a user;
    receiving a handwritten input from the user;
    performing a recognition operation on the handwritten input to produce an initial recognition result; and
    identifying a possible incorrect recognition within at least part of the initial recognition result using a self-consistency process and one or more of the stored handwriting samples, the self-consistency process identifying the possible incorrect recognition using a Kullback-Leibler distance measure operation.

2. The computer-readable medium of claim 1, wherein when the possible incorrect recognition is identified, a recognizer ignores the possible incorrect recognition.

3. The computer-readable medium of claim 1, wherein when the possible incorrect recognition is identified, a recognizer down weighs a sample associated with the possible incorrect recognition.

4. The computer-readable medium of claim 1, wherein the Kullback-Leibler distance measure operation comprises $KL(s,k) = \Sigma_c p_k(c|I_k) \log(p_k(c|I_k)/p_s(c|I_s))$.

5. The computer-readable medium of claim 4, wherein the Kullback-Leibler distance measure measures a distance between at least part of the initial recognition result and the one or more samples of handwriting of the user.

6. The computer-readable medium of claim 1, wherein a user interface for displaying a final result is modified based on the possible incorrect recognition.

7. The computer-readable medium of claim 1, comprising:
    identifying the possible incorrect recognition within at least part of the initial recognition result using a classifier confidence process.

8. The computer-readable medium of claim 7, comprising:
    using the self-consistency process and the classifier confidence process to down weigh the possible incorrect recognition.

9. The computer-readable medium of claim 7, comprising:
    using the self-consistency process and the classifier confidence process to ignore the possible incorrect recognition.

10. The computer-readable medium of claim 4, where KL(s,k) is a distance between a sample s and one or more stored exemplars k.

11. A computer-readable medium having computer-executable instructions for causing a computer to perform a method comprising:
    receive a handwritten input from a user;
    perform a recognition operation on the handwritten input to produce an initial recognition result;

perform a comparison of the initial recognition result with at least one explicit sample previously provided by the user using a Kullback-Leibler distance measure operation; and identify at least part of the initial recognition result as a possible incorrect recognition result if the comparison reveals that the at least part of the initial recognition result is not consistent with the at least one explicit sample.

12. The computer-readable medium of claim 11, having computer-executable instructions for causing a computer to perform the method comprising:

when the possible incorrect recognition is identified, modify a user interface for displaying a final result based on the possible incorrect recognition.

13. The computer-readable medium of claim 11, having computer-executable instructions for causing a computer to perform the method comprising:

when the possible incorrect recognition is identified, down weigh the possible incorrect recognition.

14. The computer-readable medium of claim 11, having computer-executable instructions for causing a computer to perform the method comprising:

when the possible incorrect recognition is identified, ignore the possible incorrect recognition.

15. The computer-readable medium of claim 11, having computer-executable instructions for causing a computer to perform the method comprising:

identify the possible incorrect recognition within at least part of the initial recognition result using a classifier confidence process.

16. The computer-readable medium of claim 15, having computer-executable instructions for causing a computer to perform the method comprising:

use the self-consistency process and the classifier confidence process to down weigh the possible incorrect recognition.

17. The computer-readable medium of claim 15, having computer-executable instructions for causing a computer to perform the method comprising:

use the self-consistency process and the classifier confidence process to ignore the possible incorrect recognition.

18. A computer-readable medium having computer-executable instructions for causing a computer to perform a method comprising:

receiving a handwritten input from a user;

performing a recognition operation on the handwritten input to produce an initial recognition result;

using one or more processes to identify a possible incorrect recognition of at least part of the initial recognition result, the one or more processes comprising at least a self-consistency process configured to identify a possible incorrect recognition using a Kullback-Leibler distance measure operation; and modifying a user interface based on the possible incorrect recognition.

19. The computer-readable medium of claim 18, having computer-executable instructions for causing a computer to perform the method comprising:

performing the Kullback-Leibler distance measure operation using $KL(s,k) = \Sigma_c p_k(c|I_k) \log(p_k(c|I_k)/p_s(c|I_s))$ where $KL(s,k)$ is a distance between a sample s and one or more stored exemplars k.

20. The computer-readable medium of claim 11, having computer-executable instructions for causing a computer to perform the method comprising:

perform the Kullback-Leibler distance measure operation using $KL(s,k) = \Sigma_c p_k(c|I_k) \log(p_k(c|I_k)/p_s(c|I_s))$.

* * * * *

UNITED STATES PATENT AND TRADEMARK OFFICE
CERTIFICATE OF CORRECTION

PATENT NO. : 7,734,094 B2  Page 1 of 1
APPLICATION NO. : 11/478500
DATED : June 8, 2010
INVENTOR(S) : Michael Revow It is certified that error appears in the above-identified patent and that said Letters Patent is hereby corrected as shown below:

In column 8, line 26, in Claim 19, after " $KL(s,k) = \sum_c p_s(c|I_k)\log(p_s(c|I_k)/p_s(c|I_s))$ " insert -- , --.

Signed and Sealed this
Tenth Day of May, 2011

David J. Kappos
*Director of the United States Patent and Trademark Office*